United States Patent
Kitchin et al.

(10) Patent No.: US 7,697,374 B2
(45) Date of Patent: Apr. 13, 2010

(54) WATER INFLATABLE VOLUMETRIC HYDROPHONE ARRAY

(75) Inventors: David A. Kitchin, Laurel, MD (US); Charles W. Kerechanin, II, Burtonsville, MD (US); Juan I. Arvelo, Jr., Dayton, MD (US); Ronald W. Mitnick, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 847 days.

(21) Appl. No.: 11/539,948

(22) Filed: Oct. 10, 2006

(65) Prior Publication Data

US 2009/0207697 A1 Aug. 20, 2009

Related U.S. Application Data

(60) Provisional application No. 60/726,772, filed on Oct. 14, 2005.

(51) Int. Cl.
*G10K 11/00* (2006.01)
*H04B 1/59* (2006.01)

(52) U.S. Cl. .............................. 367/153; 367/3; 367/4; 367/173

(58) Field of Classification Search .................. 367/3, 367/4, 5, 153, 173
See application file for complete search history.

(56) References Cited

U.S. PATENT DOCUMENTS

| 3,803,540 | A | * | 4/1974 | Mar et al. ..................... 367/4 |
|---|---|---|---|---|
| 3,889,230 | A | | 6/1975 | Knott et al. |
| 3,986,159 | A | * | 10/1976 | Horn .............................. 367/4 |
| 3,990,123 | A | | 11/1976 | Stachiw et al. |
| 4,371,957 | A | | 2/1983 | Sandoz et al. |
| 4,559,605 | A | * | 12/1985 | Norsworthy ................... 367/5 |
| 4,786,837 | A | * | 11/1988 | Kalnin et al. ............... 310/364 |
| 5,027,333 | A | | 6/1991 | Halling |
| 5,117,396 | A | | 5/1992 | Castile et al. |
| 5,257,243 | A | | 10/1993 | DeChico et al. |
| 5,367,500 | A | * | 11/1994 | Ng .............................. 367/157 |
| 5,469,407 | A | | 11/1995 | Saunders |
| 6,088,296 | A | | 7/2000 | Seaman et al. |
| 6,657,365 | B1 | | 12/2003 | Ambs |
| 6,671,230 | B1 | | 12/2003 | Benjamin |
| 6,801,475 | B2 | | 10/2004 | Anderson et al. |

OTHER PUBLICATIONS

U.S. Appl. No. 11/548,006, filed Oct. 10, 2006, Kitchin et al.
U.S. Appl. No. 11/548,082, filed Oct. 10, 2006, Arvelo et al.

(Continued)

*Primary Examiner*—Ian J Lobo
(74) *Attorney, Agent, or Firm*—Albert J. Fasulo, II

(57) ABSTRACT

A hydrophone array includes an inflatable shaped housing enclosing an interior space and formable between a collapsed configuration and an expanded configuration, a framework of compliant material disposed within the interior of the inflatable housing, and a plurality of hydrophones attached to the compliant material at respective positions, wherein said hydrophones are arranged in a predetermined geometric array when the shaped housing is in the expanded configuration. Also provided herein is a system and method for deploying the hydrophone array.

18 Claims, 4 Drawing Sheets

OTHER PUBLICATIONS

P. Ferat et al., "Mid to High-Frequency Ambient Noise Anistrophy and Notch-Filling Mechanisms," New York, 2004.

D. Abraham et al., "Beamforming with Dominant Mode Rejection," Naval Underwater Systems Center, 1990 IEEE.

H. Cox et al., "Robust Adaptive Beamforming," IEEE Transactions on Acoustics, Speech and Signal Processing, vol. ASSP-35, No. 10, Oct. 1987.

F.T. Geyling, "Suspended Rigid Underwater Arrays," J. Hydronautics, vol. 3, No. 2, Apr. 1969.

* cited by examiner

WATER INFLATABLE VOLUMETRIC HYDROPHONE ARRAY

CROSS-REFERENCE TO RELATED APPLICATIONS

This application claims priority to prior filed, U.S. Provisional Applications No. 60/726,772 filed Oct. 14, 2005, the entirety of which is incorporated herein by reference. U.S. Provisional Application No. 60/610,342 filed on Sep. 16, 2004, is also incorporated by reference herein in its entirety.

STATEMENT OF GOVERNMENTAL INTEREST

This invention is made with Government support under NAVSEA Contract No. N00024-03-D-6606, awarded by the U.S. Navy. The Government has certain rights in the invention.

BACKGROUND OF THE INVENTION

1. Field of the Invention

The present invention relates to a hydrophone array and a system and method for deploying the array, particularly hydrophone arrays for underwater acoustic sensing of subsurface marine vehicles.

2. Background of the Invention

Hydrophone arrays are used militarily to detect the presence of submarines and to provide information about their movements. Because modern submarines have the ability with cruise missiles to attack surface ships at great distances, the protection of surface shipping requires the ability to detect and track submerged submarines over vast areas of ocean. Hydrophone arrays have typically been used for this purpose.

Hydrophones are acoustic transducers which operate by detecting acoustic signals and converting them to electrical impulses which can then be transmitted by radio waves to a distant receiver. Typically, an array of hydrophones is loaded into a sonobuoy which can then be dropped by airplane into the ocean. The array is then deployed while a float containing a transmitter remains at the surface of the water.

What is yet needed is a collapsible hydrophone array support system which maintains the array in a predetermined configuration when deployed with reduced chance of twisting the wires, and which can be fit into a sonobuoy.

SUMMARY OF THE INVENTION

A hydrophone array is provided herein, the hydrophone array comprising an inflatable shaped housing enclosing an interior space and formable between a collapsed configuration and an expanded configuration, a framework of compliant material disposed within the interior of the inflatable housing, and a plurality of hydrophone units attached to the compliant material at respective positions, wherein said hydrophone units are arranged in a predetermined geometric array when the shaped housing is in the expanded configuration. Also provided herein is a system and method for deploying the hydrophone array.

The invention herein advantageously provides a means for deploying an array of hydrophones in a predetermined configuration with less chance of twisting the wires with multiple support members. The array is collapsible into a size A or smaller sonobuoy and the inflatable support structure uses no metal.

BRIEF DESCRIPTION OF THE DRAWINGS

Various embodiments are described below with reference to the drawings wherein.

DESCRIPTION OF THE PREFERRED EMBODIMENTS

Figure 1:
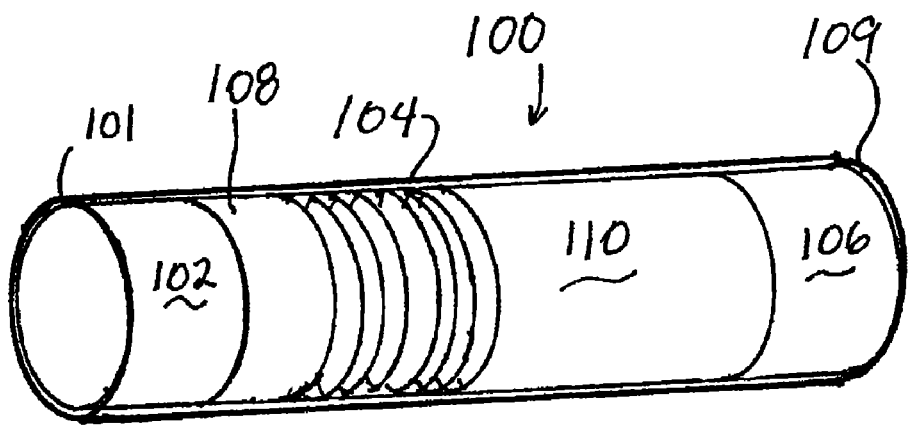
FIG. 1 illustrates the hydrophone deployment system of the invention loaded in a sonobuoy.

Referring now to FIG. 1, the hydrophone array deployment system 100 includes a float 102, battery 108, tether line 104, hydrophone array with collapsed (uninflated) support system 110, and pump 106 loaded into a sonobuoy cannister 101. The sonobuoy cannister 101 can be size A or smaller.

Figure 2:
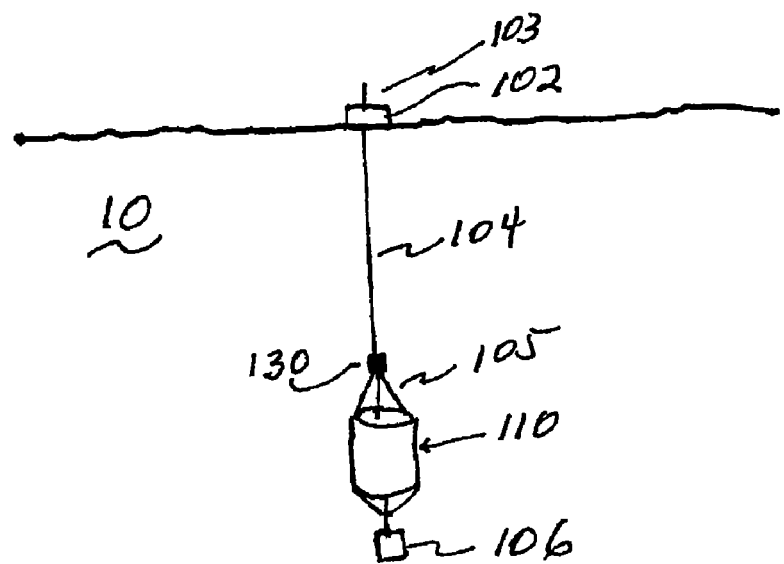
FIG. 2 illustrates the deployed system in a body of water.

Referring also now to FIG. 2, the system 100 is shown deployed in a body of water 10. Deployment can be accomplished by, for example, dropping system 100 into the water 10 by airplane, surface vessel, or any other suitable means. Jettison of the contents of the sonobuoy cannister 101 can be accomplished by various means such as the impact of the sonobuoy into the water. Alternatively, a battery 108 (e.g., seawater activated battery) can power the ejection of the contents by, for example, firing a squib. Also, back plate 109 can be jettisoned (by water impact, firing a squib, etc.) to allow the hydrophone array to descend to the proper depth. Float 102 remains at the surface of the body of water and preferably includes a transmitter with antenna 103 and the appropriate battery-powered electronics for converting the electrical signals from the hydrophones into radio waves for wireless transmission to a remote receiver. The transmitter 103 is preferably powered by battery 108. Tether 104 preferably includes a harness 105 for holding the supported hydrophone array 110 and a conductive wire for conducting electrical pulses from hydrophone units to the transmitter 103. Tether 104 can be of any length suitable for deploying the hydrophone array 110 at a desired depth and can typically range up to 250 feet in length. Amplifier 130 increases the power of the electrical signal from the hydrophones for transmission to the transmitter. Suitable amplifiers are known in the art and commonly available. Pump 106 serves as both a weight and an inflation means to introduce water into the inflatable housing 111, as discussed more fully below, and can be powered by, for example, a falling weight, a spring, or other mechanical means, or may optionally include a battery for electrical power.

The system 100 can be "active" or "passive." Active sonobuoy systems emit acoustic signals into the water and listen for the return echo. Passive systems merely listen for sounds made by underwater craft, e.g., power-plant, propellers, door closings or other mechanically generated or human generated noise.

Figure 3:
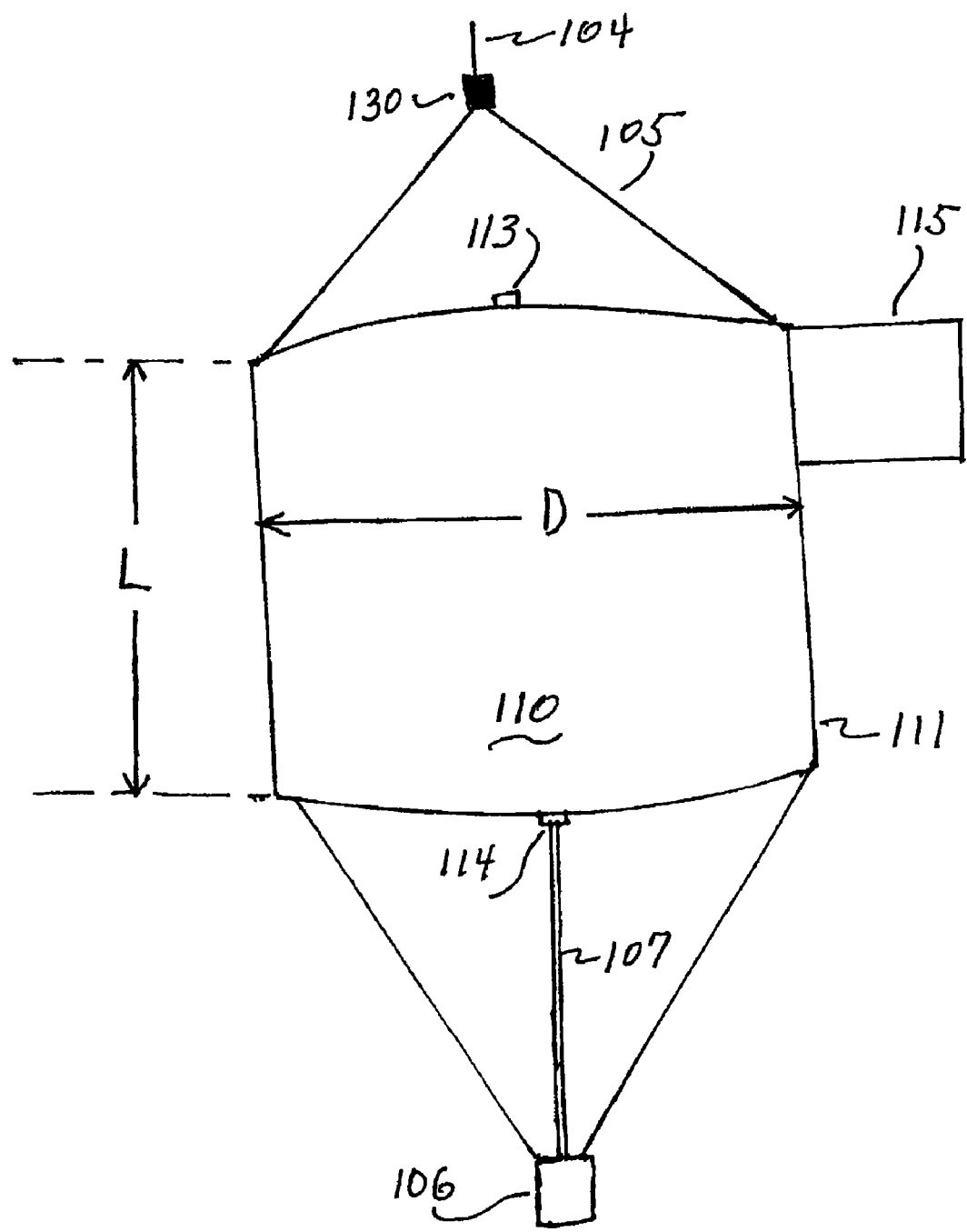
FIG. 3 illustrates the hydrophone array support.
Figure 4:
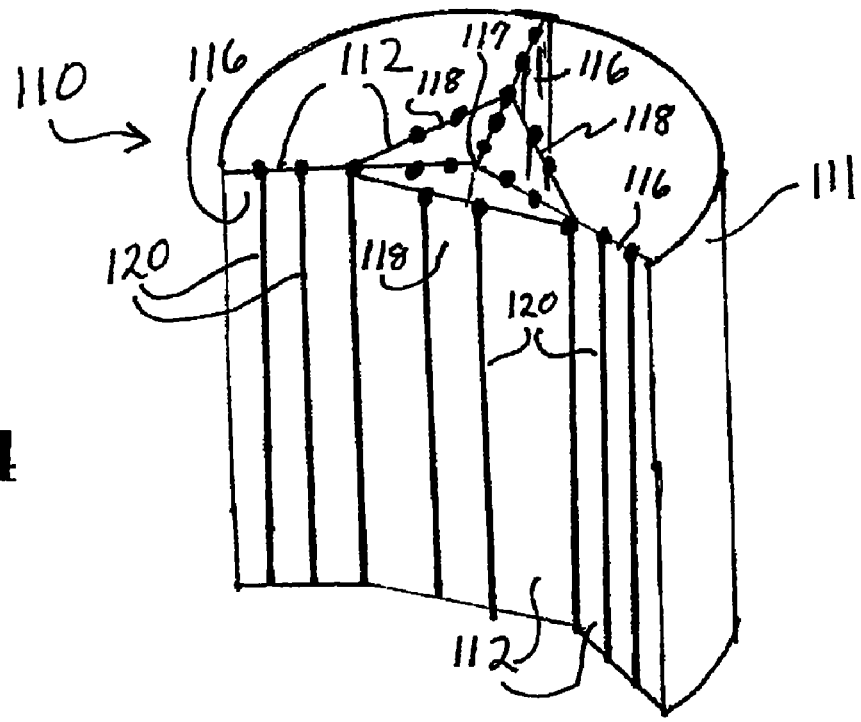
FIG. 4 is a perspective view of the hydrophone array.

Referring now to FIGS. 3 and 4, the deployable supported hydrophone array 110 includes a flexible waterproof inflatable housing which, in an uninflated collapsed configuration, can be fit within a size A or smaller sonobuoy. Upon being immersed in a body of water it is inflated with water by means of pump 106. Valve 113 at the upper portion of the housing 111 is a release valve for air or excess pressure. Valve 114 at the bottom of housing 111 is a water inlet valve, receiving a flow of water via water feed line 107 from pump 106. The inflatable housing 111 defines an interior space in which patterned compliant supports 112 are enclosed, and can be fabricated from any flexible, non-metallic waterproof material such as synthetic polymer or natural or synthetic rubber sheet (e.g., polyolefin, polyester, PVC, etc.). The housing 111 and compliant supports 112 preferably contain no metal or dense material which might cause reflections of sound waves within the hydrophone array. Optionally, one or more fins 116 can be attached to the exterior of the housing 111 to permit alignment with the ocean current and to inhibit unwanted rotation. As mentioned above, an amplifier 130 is employed to augment the electrical signals from the hydrophones 120 to which it is electrically connected.

The compliant supports 112 are preferably sheets of fabric or netting attached together and to the interior of the housing 111 and are so constructed such that when the housing 111 is inflated the supports 112 of compliant fabric are arranged in a three dimensional pattern (FIG. 4). Acoustic transducers such as hydrophone units 120 are affixed to the supports 112 of compliant fabric sheets such that when fully deployed the hydrophone units 120 are oriented in vertical parallel lines. The hydrophone units 120 can be sewn into the compliant fabric 112, bonded by adhesive, secured in pockets in the fabric, or affixed to the compliant fabric by any suitable means. Hydrophone units suitable for use in the invention are commercially available from Argotech Inc. of Fort Lauderdale, Fla.

Referring now to FIG. 4, the hydrophone units 120 when deployed are arranged as horizontally spaced-apart, vertically extending linear units so as to define, with the compliant fabric supports 112, radially oriented planes 116 extending from a central line 117. Preferably, the array includes planes 118 extending laterally between the radially oriented planes 116. As shown in FIG. 4, three radial planar extensions 116 are included in a tripodal array containing 20-30 hydrophone units 120. The hydrophones are preferably spaced apart from each other by a distance of from about $\lambda/2$ to about $\lambda/4$ wherein $\lambda$ is the wavelength of the target acoustic signal. However, other configurations can alternatively be employed, such as 5-membered or 7-membered planar extensions 116, or other multi-podal arrangements.

The optimal dimensions of the hydrophone array depend upon the target frequency of the acoustic signals, expected tilt of the array due to relative current between the surface float and the hydrophone array, and operating depth. A preferred length for the hydrophone wires is $4\delta$ or $5\delta$, where $\delta$ is the wavelength of the target acoustic signal. This length provides a balance between vertical bandwidth (given the expected array tilt) and end-fire notch depth (to suppress any target frequency band noise originating from the surface float given the operating depth). For example, referring to FIG. 3, L is the length of the hydrophone wires and D is the diameter of the array. For a design frequency of 10 kHz, L is preferably about 26 inches and D is preferably about 28 inches. The inflatable housing 111 holds a volume of less than about 40 gallons of water and in a collapsed state would fit in a size A sonobuoy canister. For a design frequency of 15 kHz, L is preferably about 18 inches, D is preferably about 24 inches and the inflatable housing 111 holds less than about 20 gallons of water and would fit in a size A/2 sonobuoy canister.

Various types of acoustic transducers can be used to detect acoustic waves transmitted through the water. For example, the acoustic transducer can comprise a tube formed at least in part of a piezo material. Piezo materials can be piezoelectric, which generate an electrical pulse or current upon receiving a mechanical impulse such as from an acoustic vibration, or piezoresistive, which change resistance upon receiving a mechanical impulse. Piezoelectric material can comprise an active polarized ceramic material, such as barium titanate or lead zirconate titanate (PZT). The piezoelectric material can, in another embodiment, be a piezoelectric polymer material, such as polyvinylidene difluoride (PVDF), or a piezo-rubber composite material. Piezoresistive materials include, for example, conductive elastomeric polymeric foams or rubbers which become more conductive when compressed.

Figure 5:
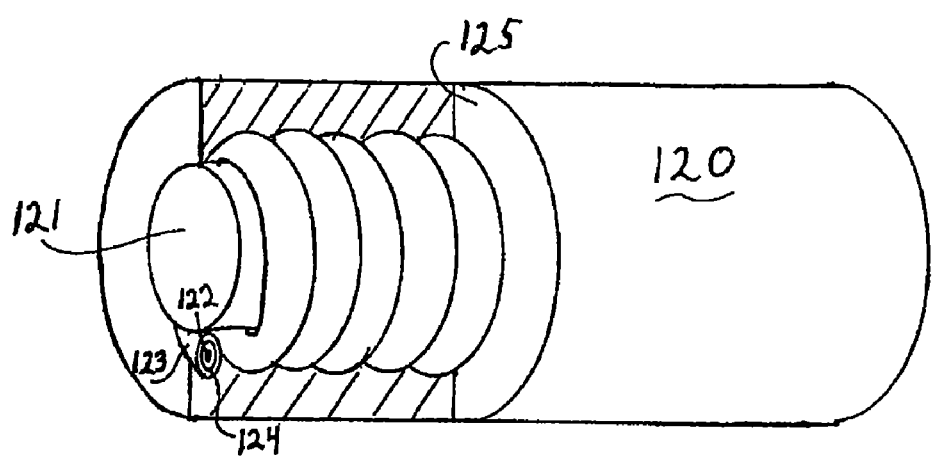
FIG. 5 is a partly sectional perspective view of an individual hydrophone unit; and, FIG. 6 is a diagram for an amplifier circuit for processing signals from the hydrophone array.

For purposes of the present invention the hydrophone needs to be sufficiently flexible to be folded into a sonobuoy canister. Typically, hydrophones include a central or core conductor, an outer conductor, and a layer of piezo material disposed between, and in contact with, the core conductor and outer conductor in a coaxial configuration. When subjected to mechanical force the piezo material, such as polyvinylidene difluoride (PVDF) generates an electrical current which is carried by the conductors. However, in a new, preferred embodiment, hydrophone 120 includes a "piano" wire type construction as shown in FIG. 5. In particular, a central wire 121 fabricated from a resilient metallic or non-metallic material, preferably spring steel, provides a resilient core which gives the hydrophone a shape memory and a biasing force such that when the hydrophone 120 is released from the canister 101 into the seawater it automatically returns to a straight configuration. A conductive wire coil 122 of smaller diameter wire than the central spring steel wire 121, is first coated with a layer 124 of piezo material (e.g., PVDF) and then, in one embodiment of the invention, is coated with a conductive layer 123 of copper, aluminum, silver, gold or the like. Preferably, conductive layer 123 is applied (e.g., by spraying, dipping, painting, etc.) as a silver ink. The conductive wire coil 122 is then tightly wound around the central wire 121. The conductive wire coil 122 is preferably fabricated from copper, aluminum, silver, gold, or alloys thereof, or of any other highly conductive ductile and flexible material. In an especially preferred embodiment, the wire coil 122 comprises a copper wire. In this embodiment the conductive wire coil 122 acts as an inner conductor and the conductive coating 123 acts as an outer conductor, both being in contact with the piezo material layer 124. Optionally, the conductive layer 123 can be applied after the piezo material-coated conductive wire 122 is coiled around the resilient central wire 121, preferably under pressure. In yet another embodiment the conductive layer (e.g., silver ink) is applied both before and after the piezo material-coated conductive wire 122 is coiled around the resilient central wire 121. Preferably, hydrophone 120 can include an outer jacket 125 of polyurethane or other waterproof, electrically insulative flexible material to prevent electrical signals from the hydrophone from being dissipated in the seawater. The copper coil 122 provides significantly greater flexibility than a comparably sized hydrophone using a coaxial configuration with a solid copper core. The hydrophone wire 120 typically has a diameter ranging from about $1/8$ to about $1/10$ inches.

The system 100 is deployed, for example, by launch from an airplane. When the sonobuoy enters the water the contents of the sonobuoy are ejected from the cannister. The float remains on the water surface and the deployable array 110 drops to a predetermined depth. Pump 106 acts as a ballast. A falling weight or other suitable mechanism powers pump 106 to deliver water through feed line 107 and water inlet valve 114 into the flexible housing 110 which then expands to deploy the array of hydrophones 120 and sheets of compliant material 112. Air or excess pressure is released through valve 113.

Figure 6:
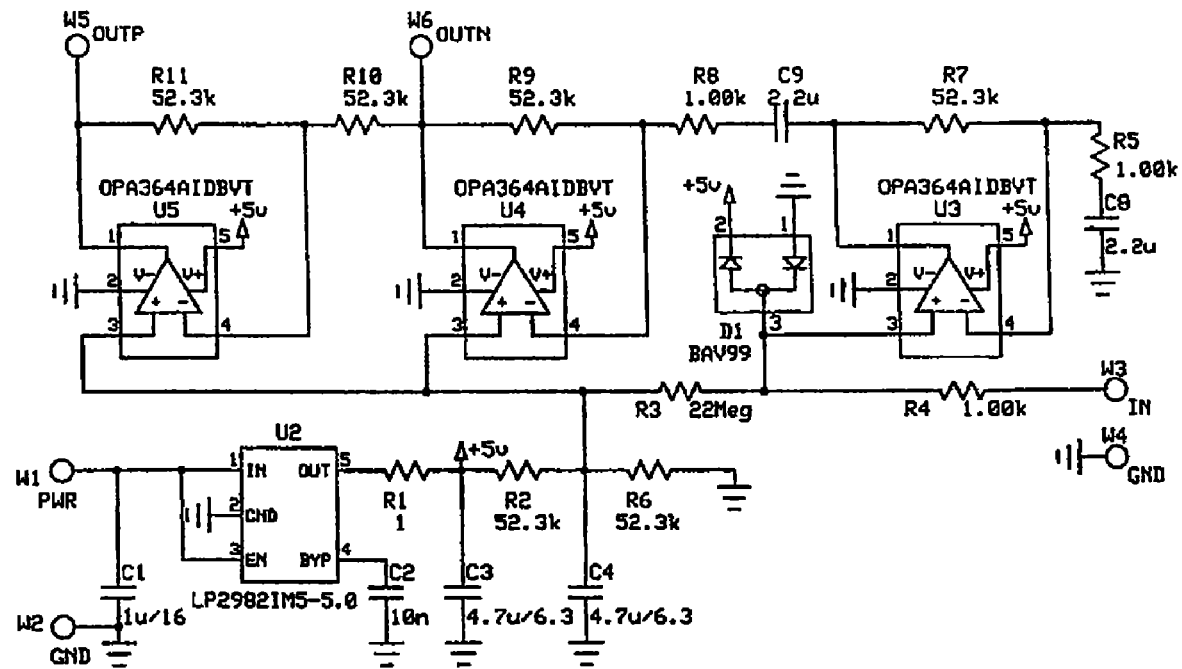

Acoustic waves which strike the array are converted by the hydrophone array 110 are converted by the hydrophone units 120 into electrical signals which are processed by an amplifier 130. A circuit diagram for an amplifier suitable for use in the present invention is illustrated in FIG. 6. The circuit can be embodied in a printed circuit board as small as 0.325 inches by 0.800 inches. The circuit shown in FIG. 6 has the following parameters:

| | |
|---|---|
| Output voltage swing | 5 volts p-p (10 volt differential) |
| Gain | 686.68 dB to each output (2718 V/V), 74.68 dB to differential output, −3 dB at 114 Hz and well above 50 kHz. The gain can be altered by replacing two resistors. |
| Input impedance | 22 Megaohms, single ended |
| Input noise | 20 nV per root Hz at 10 kHz (estimated) |
| Power | 6 to 16 V DC, estimated 2.5 mA |

While the above description contains many specifics, these specifics should not be construed as limitations of the invention, but merely as exemplifications of preferred embodiments thereof. For example, while the invention herein is particularly advantageous for military applications and has been described in terms of detection of submarines, it can clearly be employed in any situation wherein acoustic detection is needed, such as oceanographic or other scientific studies, rescue operations, and the like. Those skilled in the art will envision many other embodiments within the scope and spirit of the invention as defined by the claims appended hereto.

What is claimed is:

1. A hydrophone array, comprising:
   a) an inflatable shaped housing enclosing an interior space and formable between a collapsed configuration and an expanded configuration;
   b) a framework of compliant material disposed within the interior of the inflatable housing; and
   c) a plurality of hydrophone units attached to the compliant material at respective positions, wherein said hydrophone units are arranged in a predetermined geometric array when the shaped housing is in the expanded configuration;
   wherein each hydrophone unit comprises a central wire of spring steel, and a copper wire coiled around the central wire of spring steel, said copper wire being coated with polyvinylidene difluoride and said hydrophone unit further comprising a layer of conductive silver ink deposited on the polyvinylidene difluoride-coated copper wire.

2. The hydrophone array of claim 1 wherein the inflatable shaped housing is fabricated from a flexible, water proof material.

3. The hydrophone array of claim 1 wherein the framework of compliant material comprises at least one fabric sheet.

4. The hydrophone array of claim 3 wherein the hydrophone units are sewn into the fabric or disposed within a pocket of the fabric.

5. The hydrophone array of claim 1 wherein the framework of compliant material comprises at least three fabric sheets defining radially oriented planes extending from a central line so as to form a multipodal configuration.

6. The hydrophone array of claim 5 wherein the framework of compliant material further includes at least three sheets of fabric extending laterally between the radially oriented planes.

7. The hydrophone array of claim 1 wherein each hydrophone unit comprises a layer of flexible piezo material disposed between two layers of conductive materials.

8. The hydrophone array of claim 7 wherein the piezo material is polyvinylidene difluoride.

9. The hydrophone array of claim 1 wherein the hydrophone units in the array are spaced out from each other by a distance of $\lambda/2$ to $\lambda 4$ wherein $\lambda$ is the wavelength of a target acoustic signal.

10. A hydrophone array deployment system comprising:
   a) an inflatable shaped housing enclosing an interior space and formable between a collapsed configuration and an expanded configuration;
   b) a framework of compliant material disposed within the interior of the inflatable housing;
   c) a plurality of hydrophone units attached to the compliant material at respective positions, wherein said hydrophone units are arranged in a predetermined geometric array when the shaped housing is in the expanded configuration, said hydrophone units being receptive of acoustic signals transmitted through fluid water and converting said acoustic signals to electrical signals;
   d) a container for enclosing the shaped body in the collapsed configuration;
   e) means for ejecting the collapsed shaped body from the container;
   f) means for inflating the shaped body with water to reform the shaped body into the expanded configuration; and
   g) means for converting said electrical signals to radio signals and transmitting said radio signals to a remote receiver;
   wherein each hydrophone unit comprises a central wire of spring steel, and a copper wire coiled around the central wire of spring steel, said copper wire being coated with polyvinylidene difluoride and said hydrophone unit further comprising a layer of conductive silver ink deposited on the polyvinylidene difluoride-coated copper wire.

11. The system of claim 10 wherein the inflatable shaped housing is fabricated from a flexible, water proof material.

12. The system of claim 10 wherein the compliant material comprises at least one fabric sheet.

13. The system of claim 12 wherein the hydrophone units are sewn into the fabric.

14. The system of claim 10 wherein the means for inflating comprises a pump.

15. The system of claim 10 further including a seawater activated battery.

16. A method for deploying a hydrophone array comprising:
   a) providing a hydrophone array including an inflatable shaped housing enclosing an interior space and formable between a collapsed configuration and an expanded configuration, a framework of compliant material disposed within the interior of the inflatable housing, a plurality of hydrophone units attached to the compliant material at respective positions, wherein said hydrophone units are arranged in a predetermined geometric array when the shaped housing is in the expanded configuration, said hydrophone units being receptive of acoustic signals transmitted through water and converting said acoustic signals to electrical signals, said hydrophone array being disposed within a container;

b) releasing said container into a body of water;
c) ejecting the hydrophone array from the container into the body of water; and
d) inflating the shaped housing with water;
wherein each hydrophone unit comprises a central wire of spring steel, and a copper wire coiled around the central wire of spring steel, said copper wire being coated with polyvinylidene difluoride and said hydrophone unit further comprising a layer of conductive silver ink deposited on the polyvinylidene difluoride-coated copper wire.

17. The method of claim 16 wherein the hydrophone array is deployed in a multipodal volumetric array.

18. The method of claim 16 further comprising providing a float with means for receiving electrical signals from the hydrophone units, converting said electrical signals to radio signals, and transmitting said radio signals to a remote receiver.

* * * * *